Figure 1:
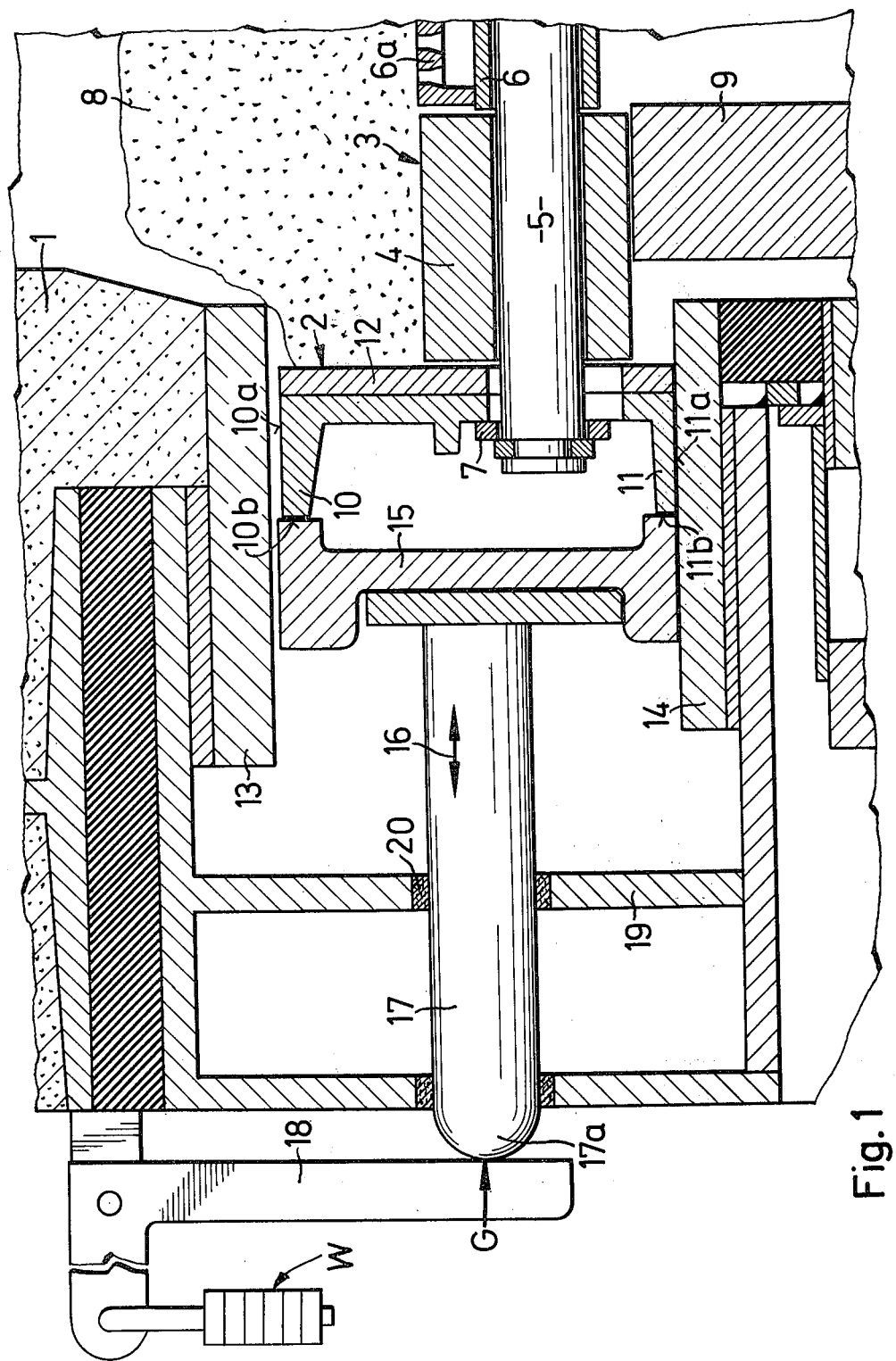

United States Patent [19]
Korting

[11] 3,987,738
[45] Oct. 26, 1976

[54] SEAL FOR A TRAVELING GRATE

[75] Inventor: Reinhard Korting, Neubeckum, Germany

[73] Assignee: Polysius AG, Neubeckum, Germany

[22] Filed: May 14, 1975

[21] Appl. No.: 577,198

[30] Foreign Application Priority Data
May 27, 1974 Germany............... 7418352[U]

[52] U.S. Cl. .................... 110/40 E; 266/179; 432/244
[51] Int. Cl.² ................. F23H 11/00; F27D 3/00
[58] Field of Search ......... 110/40 R, 40 E; 266/21; 432/244

[56] References Cited
UNITED STATES PATENTS

| | | | |
|---|---|---|---|
| 1,880,146 | 9/1932 | Morison | 266/21 |
| 3,131,050 | 4/1964 | Donoso | 266/21 |
| 3,172,936 | 3/1965 | Koontz | 266/21 |
| 3,842,763 | 10/1974 | Korting | 432/244 |

Primary Examiner—Kenneth W. Sprague
Attorney, Agent, or Firm—Learman & McCulloch

[57] ABSTRACT

A grate chain with a plurality of chain members hingedly joined together by bolts and having lateral edge plates with outwardly directed slide lips by which they are sealingly supported in the traveling grate housing.

5 Claims, 2 Drawing Figures

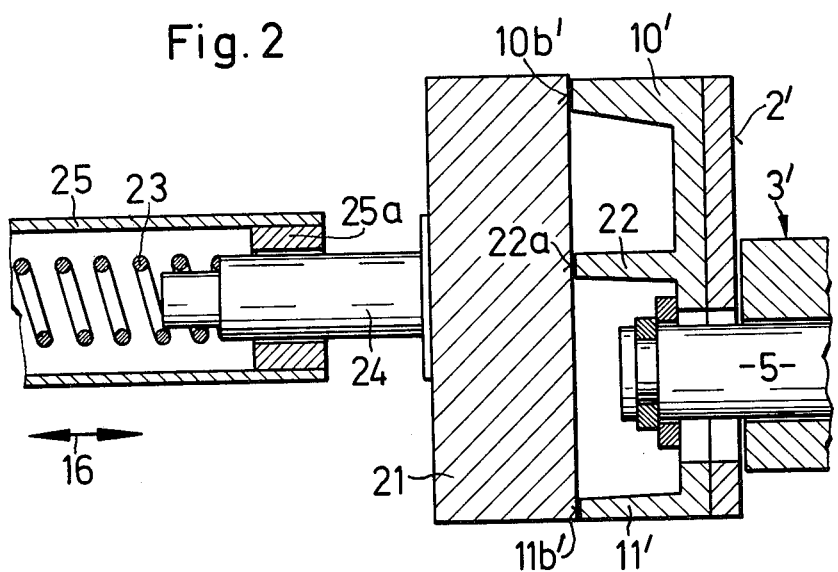

SEAL FOR A TRAVELING GRATE

SUMMARY OF THE INVENTION

Traveling grates of the type described are used for example in the preheating, firing and cooling of various materials. During their treatment the materials are laid on the upper section of the traveling grate chain and conveyed through the treatment zones, with treatment gases being fed through the layer of material. In practice however there are always difficulties in the lateral sealing of the traveling grate chains which are usually conveyed with their lateral edge plates between slide rails disposed in the traveling grate housing.

With the traveling grates known in practice it is known to provide an upper and a lower slide rail, between which are disposed the lateral edge plates with their upper and lower sliding edges; the lower slide rail is adapted to move vertically so that the gap, caused for example by wear, between the upper edge of the edge plates and the upper slide rail can be kept as small as possible. Since the lower vertically movable slide rail is subject to considerable loads in this known construction, there is an increased risk of fatigue in the members, which are normally elastically movable, so that especially under heavy wear an ever-growing gap is formed between the upper edge of the lateral edge plates and the upper slide rail; an undesired leakage of treatment gases through this growing gap then occurs, which in some cases can have a strong heating effect, so that the lateral edge plates can be subjected to overheating and consequent damage.

In a known construction (German Gebrauchsmuster No. 7244502) these disadvantages referred to are avoided by giving the lateral edge plates outwardly directed slide lips forming upper and lower horizontally disposed sliding surfaces which cooperate with the upper and lower slide rails in the traveling grate housing, the lower slide rail being fixed in position and the upper slide rail movable in the vertical direction.

In all known constructions there must be a certain gap in the width of the traveling grate chain between the parts threaded on to the bolts (such as lateral edge plates, chain members) and the spacing tubes between the chain members. However in the course of operation this also results in wear, so that the total gap across the width of the traveling grate chain is increased as time goes by. But this total gap is not usually uniformly distributed over the full width of the chain, and is mainly found between the parts movable on the grate bolts at the lateral edge of the traveling grate chain. Especially the finer material from the layer of material being conveyed then drops down through this gap, so that gas channels are formed through which the treatment gases flow because of the lower resisitance to flow. With hot treatment gases the deviation of such gases past the outer chain members and the lateral edge plates again leads to undesirable damage.

The invention is thus based on the problem of providing a traveling grate of the type initially defined, which avoids the gaps, caused especially by wear, in the vicinity of the lateral edge plates and hence largely avoids streams of leaking gas.

According to the invention this problem is solved in that lateral sealing bars, movable in the axial direction of the grate bolts, are resiliently pressed against the generally vertically disposed outer surfaces of the slide lips.

With this construction as provided by the invention, effective sealing in the vicinity of the slide guide provided in the grate housing for the lateral edge plates is provided by a sealing bar which is independent of the upper and lower guide rails. Since these sealing bars act with a resilient pressure in the axial direction of the grate bolts, in this manner at least the outermost of the parts of the traveling grate chain disposed on the grate bolts are at the same time constantly pressed together, so that while the requisite play in the chain is maintained, undesired gaps are prevented from forming between these movable parts, especially in the area of the lateral edge plates. This desirable construction can thus largely ensure that no unwanted streams of leaking gas are formed.

The invention will be described below with reference to the two embodiments shown in the drawings, wherein:

FIG. 1 is a partial cross-section in the area of the lateral edge plates of the grate chain in a traveling grate in accordance with the invention; and FIG. 2 is a portion from FIG. 1 with a different construction of the member which presses the sealing bar against the sealing lips.

FIG. 1 shows part of the housing wall 1 of a traveling grate in accordance with the invention, wherein the lateral edge plates designated generally 2 of the traveling grate chain 3 are sealingly mounted.

The grated chain 3 contains a plurality of chain members 4, hingedly connected together into an endless grate chain by transversely extending chain pins 5. Spacer tubes 6 (merely indicated) can also be disposed on pins 5 between the individual chain members 4, with the grate plates 6a resting on these spacer tubes. The lateral termination of the grate chain 3 on the two longitudinal sides consists of lateral edge plates 2 associated with the chain members 4 and hingedly interconnected by chain pins 5 in similar manner to the chain members 4 and secured by welded-on discs 7 or the like. A layer of material 8 is conveyed through the traveling grate on the upper arm of the grate chain 3, with treatment gases passing through the material (e.g. from the top downward). The chain members 4 of the grate chain 3 are supported on track support rollers 9, merely indicated.

In the embodiment shown, each lateral edge plate 2 has at least two outwardly projecting slide lips, these being an upper slide lip 10 and a lower slide lip 11, both projecting outward generally at right angles to the actual plate body 12. The upper slide lip 10 at its upper side 10a and the lower slide lip at its lower side 11a each have slide guide surfaces, cooperating with upper and lower guide rails 13 and 14 respectively and disposed in the housing wall; if desired at least one of these guide rails can be made adjustable in the vertical direction.

The outwardly directed slide lips 10, 11 of the lateral edge plate 2 also have generally vertically directed outer surfaces 10b, 11b, defining sliding seal surfaces, and against which is resiliently pressed a lateral sealing bar 15, movable in the axial direction of the chain pins 5 (see double arrow 16). Sealing bar 15 may be located between the guide rails 13, 14, then resting on the lower guide rail 14.

Biasing of sealing bar 15 into sealing engagement with seal surfaces 10b, 11b can be provided in various ways. In the embodiment shown in FIG. 1 the outer side of sealing bar 15 is acted on by a ram 17 having at its outer free end a rounded surface 17a (e.g. a hemispherical surface) acted on by a bell crank lever 18 pivotally attached to the housing wall 1 and gravitationally biased in the direction G (arrow G) by a weight W. Ram 17 passes through a web-like wall 19, with a seal 20 in the wall and surrounding the ram.

FIG. 2 shows a somewhat different arrangement and construction for the lateral sealing bar; otherwise all the components formed in similar manner to those in FIG. 1 are given the same reference number, with the addition of a dash.

Here the grate chain 3' is formed in the same way and includes the chain members 4', to which correspond the lateral edge plates 2' and which are hingedly connected together by chain pins 5'.

Against the vertical outer sliding surfaces 10b' and 11b' of the upper and lower slide lips 10' and 11' there is resiliently pressed a sealing bar 21, which in this case has for instance a full rectangular cross-section; obviously it could also have a cross-section profiled in similar manner to the sealing bar 15 in FIG. 1. As may be seen from the drawing, the lateral edge plate 2' can have a further central slide lip 22 lying between the two outer slide lips 10', 11', said lip 22 also being outwardly directed generally parallel to the slide lips 10' and 11' and having a vertically extending outer slide surface 22a which likewise cooperates with the sealing bar 21.

In this case the resilient pressure of the sealing bar 21 in the axial direction of chain pin 5' (arrow 16') is provided by a compression spring 23, disposed in a tube 25 between an abutment (not shown) on the traveling grate housing wall and a ram 24 connected to the sealing bar 21. The ram 24 is slidably movable in the end wall 25a of the tube 24 and sealed.

What is claimed is:
1. In a traveling grate construction having a housing through which an endless grate chain is movable, the improvement comprising sealing lips carried by said chain and projecting outwardly from opposite sides thereof, each of said sealing lips having a generally vertically disposed sealing surface; sealing means supported by said housing at opposite sides of said chain for movements into and out of engagement with said sealing surface of the associated sealing lip; and means biasing each of said sealing means into engagement with the associated sealing lip.

2. The invention defined in claim 1 wherein each of said sealing means is supported by said housing for substantially horizontal movements.

3. The invention defined in claim 1 wherein said biasing means comprises a compression spring.

4. The invention defined in claim 1 wherein said biasing means comprises a gravitationally biased plunger.

5. The invention defined in claim 1 wherein each of said sealing means comprises a bar having spaced, horizontally disposed upper and lower flanges, and guide surfaces on said housing slidably engageable with said flanges.

* * * * *